Nov. 3, 1970 — W. K. PRIESE — 3,537,682

HIGH TEMPERATURE BALL VALVE

Filed Jan. 12, 1968

Inventor
Werner K. Priese
By: Olson, Trexler, Wolters & Bushnell attys

United States Patent Office 3,537,682
Patented Nov. 3, 1970

3,537,682
HIGH TEMPERATURE BALL VALVE
Werner K. Priese, Barrington, Ill., assignor to Hills-
McCanna Company, Carpentersville, Ill., a corporation of Delaware
Filed Jan. 12, 1968, Ser. No. 697,518
Int. Cl. F16k 41/00, 43/00
U.S. Cl. 251—214                                   5 Claims

ABSTRACT OF THE DISCLOSURE

For controlling very hot fluids, a ball valve having an internal chamber space receiving fluid under the highest line pressure applied to the valve and containing within a high temperature zone of the chamber space a flow control assembly that is dynamically tightened and operated by tightening spring and operating structure accommodated in a low temperature zone of the chamber space which is effectively insulated thermally from the high temperature zone of the chamber space.

---

Figure 1:
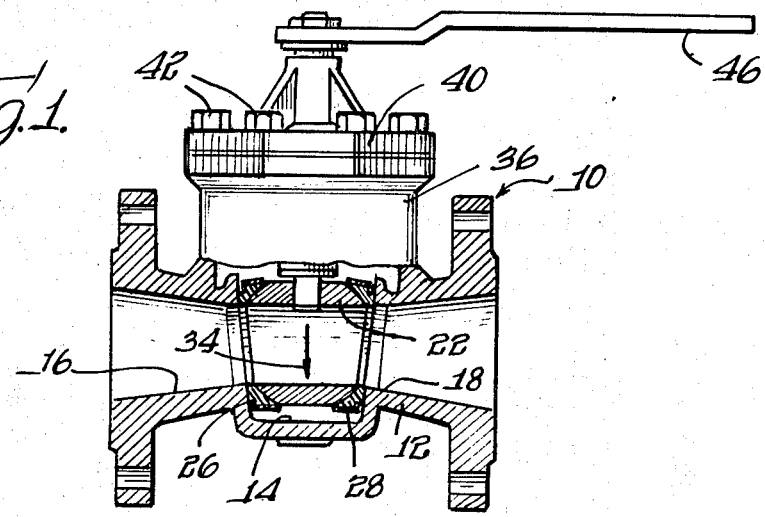

The present invention relates to the problem of controlling, by means of a valve, the flow of fluids having very high temperatures. By way of illustration, the temperature levels of the fluid controlled may be of the order of 1200° to 1300° F. at which temperatures the fluid may be wholly or in large measure in a gaseous state.

The deleterious effects of such temperatures on the structure and function of ball valves can make useless conventional valves that afford inherently many valuable advantages in the control of fluid at lower temperatures. In general, the controlling by valves of high temperature fluids has been marked heretofore by troublesome difficulties and shortcomings in the operation and construction of prior valves used for this purpose.

One object of the invention is to provide a new and improved ball valve that will operate reliably and satisfactorily to control the flow of very high temperature fluid while at the same time providing in the service of controlling such high temperature fluid advantages, both srtuctural and functional, heretofore available only in valves suitable for controlling fluid at much lower temperatures.

Another object is to provide for controlling very high temperature fluids a ball valve having a flow control assembly movably supported between converging seat support surfaces and dynamically tightened and operated in service by dynamic spring tightening means and control means exposed to the fluid controlled and to the full fluid pressure within the valve while at the same time being effectively protected thermally from the destructive high temperatures of the fluid controlled by the valve.

A further object is to provide, for controlling very high temperature fluids, an improved ball valve of the character recited which affords effective thermal protection from the destructive temperatures of the fluid controlled of critical valve structure subject to deterioration and destruction by such high temperatures while at the same time avoiding excessive cooling of the fluid that is controlled by the valve, it normally being desirable in the service in which such valves are used to maintain the very high temperatures of the fluid despite the problems created by such temperatures in controlling the flow of the fluid.

A more particular object is to provide a valve as recited in the preceding objects which facilitates opening and closing of the valve by virtue of structurally achieved functional characteristis of the valve which limit the temperature of the external valve control handle to a markedly low level in relation to the temperature of the fluid controlled.

Figure 2:
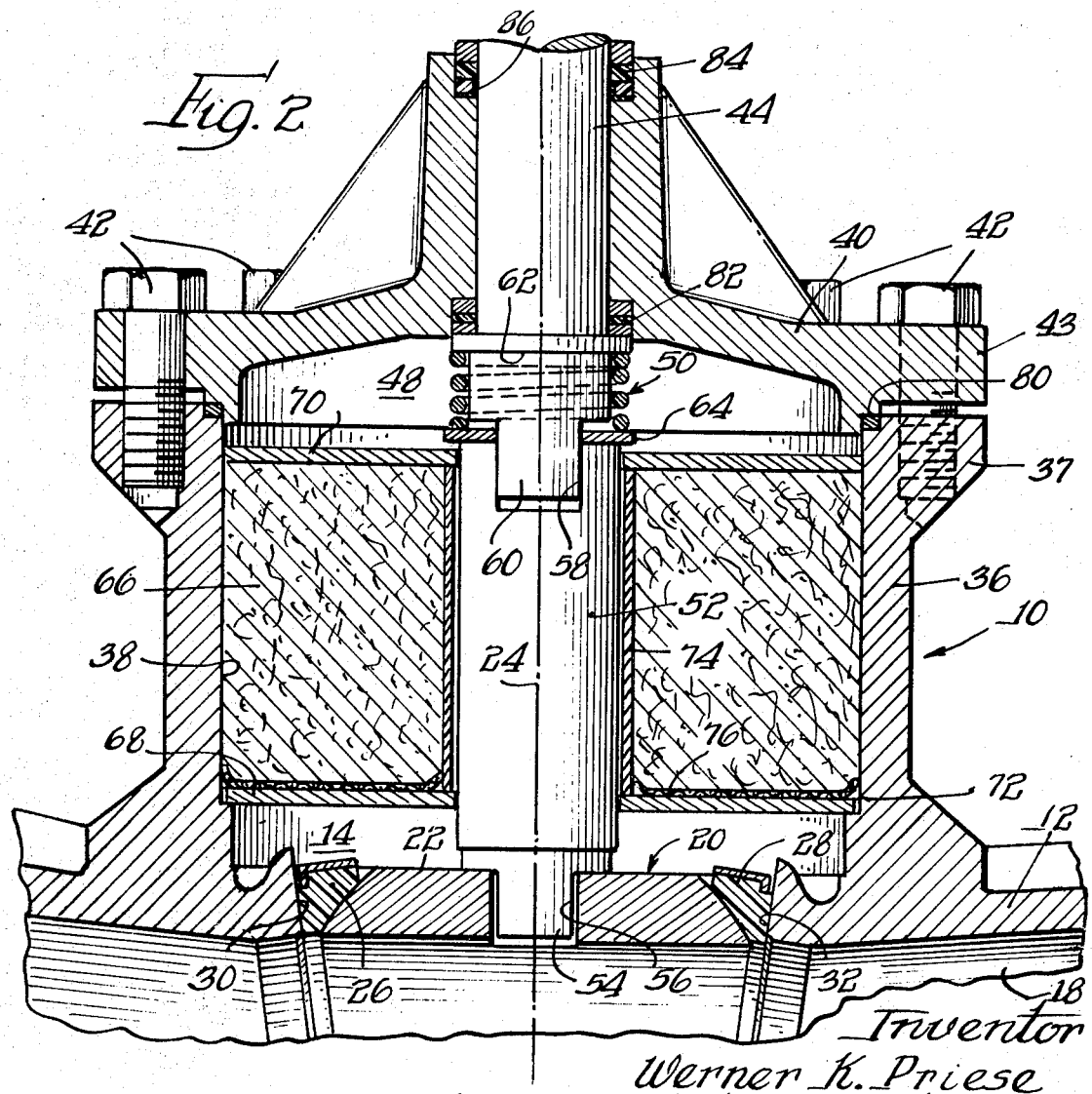

Other objects and advantages will become apparent from the following description of the exemplary embodiment of the invention illustrated in the drawings, in which:

FIG. 1 is a side view of a ball valve embodying the invention, the valve body and internal flow control structure being broken away by a fragmentary longitudinal sectioning of the lower portion of the valve as shown to better reveal the construction of flow control elements; and FIG. 2 is a fragmentary, longitudinal sectional view on an enlarged scale showing the internal construction of the upper portion of the valve of FIG. 1.

Referring to the drawings in greater detail, the ball valve 10 forming the exemplary embodiment of the invention illustrated comprises a valve body 12 defining an internal valve chamber 14 and two flow passages 16, 18 opening into opposite sides of the chamber 14. Opposite ends of the instant valve body 12 are flanged for connection with coacting conduits (not shown) for fluid under very high temperatures which connect with the flow passages 16, 18.

A movable flow control assembly, denoted generally by the number 20 in FIG. 2, comprises a flow control ball 22 movably disposed in the valve chamber 14 for rotation about an axis 24, FIG. 2, and two annular valve seats 26, 28 sealably engaging the ball 22 on opposite sides as illustrated and being disposed in encircling relation to the inner ends of the respective passages 16, 18.

The annular seats 26, 28 are slidably supported on two generally flat seat support surfaces 30, 32 formed on the body 12 in encircling relation to the inner ends of the respective passages 16, 18 and converging toward each other in a direction transverse to the passages 16, 18 and represented in FIG. 1 by the arrow 34. The direction of convergence 34 of the seat support surfaces 30, 32 is parallel to the axis of rotation 24 of the ball 22.

It is contemplated, as indicated, that the valve 10 will be used to control fluids at very high temperature levels, which may, for example, be of the order of 1200° or 1300° F.

To withstand the high temperatures of the fluid controlled by the valve, the seats 26, 28 are preferably formed of a suitable sintered carbon-graphite material. Such materials are commercially available and are well known to those skilled in the designing of ball valves.

A high pressure housing 36 on the valve body 12 has a generally cylindrical outer form modified by a radially protruding upper periphery 37 of octagonal form, FIGS. 1 and 2. Internally, the housing 36 defines a well space 38 of generally cylindrical form opening inwardly into the chamber 14 accommodating the flow control assembly 20 as illustrated in FIG. 2. The well space 38 extends outwardly from the chamber 14 in generally coaxial relation to the axis 24 of rotation of the ball 20, the well space 38 extending away from the ball 22 in a direction which is the reverse of the direction 34 of convergence of the seat support surfaces 30, 32.

The outer end of the generally cylindrical well space 38 is covered by a bonnet 40 removably secured, as shown, to the adjacent outer end of the high pressure housing 36 by eight cap screws 42 extending through an octagonal marginal edge 43 of the bonnet 40 into the octagonal periphery 37 of the housing 36.

The ball 22 is rotated between its open valve and closed valve positions by a control stem 44 journalled in the bonnet 40 in coaxial direction to the axis 24 of ball rotation and connected at its outer end to an operating handle 46. The inner end of the control stem 44 extends into internal valve space 48, FIG. 2, located within the valve adjacent the inner face of the bonnet 40 at the outer end of the well space 38 encircled by the high pressure housing 36. The internal space 48 adjacent the bonnet 40 together with the well space 38 form an outward continuation of the valve chamber 14.

Optimum tightening of the valve 10 is maintained by continuously urging the flow control assembly 20, comprising the ball 22 and seats 26, 28, in the direction 34 of convergence of the seat support surfaces 30, 32.

This is effected by means of a dynamic valve tightening spring 50, FIG. 2, accommodated within the space 48 immediately adjacent the inner face of the bonnet 40. The spring 50 is preferably fashioned from a metal alloy highly resistant to loss of physical strength and high working temperatures. Metal alloys suitable for this purpose are readily available commercially and are known to those skilled in the valve art. A number of such alloys have high nickel and chromium contents. Alloys sold commercially under the trademarks "Rene" and "Inconel" can be suitable materials for the spring. Thus positioned as described, the spring 50 is spaced from the flow control assembly 20 by a distance substantially equal in extent to the full longitudinal length of the well space 38 along the rotary axis 24 of the ball 22, FIG. 2.

Force in the direction 34, FIG. 1, is transmitted from the spring 50 to the flow control assembly 20 by a longitudinal member 52 extending through the well space 38 in coaxial relation to the axis 24.

In the preferred construction illustrated, the longitudinal member 52, which transmits the longitudinal force of the spring 50 in the manner to be described, also serves to transmit ball turning torque from the inner end of the control stem 44 to the ball 22. By reason of its function in transmitting valve operating torque, the member 52 will, for convenience, be referred to as the "inner" control stem while the control stem member 44 journalled in the bonnet 40 will be referred to, for purposes of differentiation, as the "outer" control stem.

In the preferred construction illustrated, the inner end of the inner control stem 52 abuts against the ball 22 and has a driving tang 54 engaging a slot 56 in the ball to rotate the latter.

A slot 58 formed in the outer end of the inner control stem 52 adjacent the outer end of the well space 38 receives a driving tang 60 on the inner end of the outer control stem 44 to form between the outer stem 44 and the inner stem 52 a driving coupling 62 which permits the inner stem 52 to move axially in relation to the outer stem 44, by virtue of the slidable engagement of the tang 60 with the slot 58.

The spring 50 is a helical compression spring formed of metal. It encircles the inner end of the outer control stem 44 within the space 48 and reacts outwardly on an annular shoulder 62 carried by the outer control stem. The inner end of the spring 50 acts inwardly on a thrust washer 64 encircling the driving tang 60 and resting against the outer end of the inner control stem 52 to urge the latter axially inward. For purposes of description, the thrust washer 64 and the shoulder 62, respectively, may be regarded as spring seats or abutments which receive the reaction of the spring 50 which operates dynamically under a residual compressive loading.

As previously intimated, the lower portion of the valve chamber 14, with reference to FIG. 2, accommodating the flow control assembly 20 becomes filled with the high temperature fluid admitted to the valve and is consequently heated to the very high temperatures of the fluid controlled.

At the same time, the space 48 containing the dynamic spring 50 adjacent the bonnet 40 is effectively protected from the high temperatures prevailing around the ball 22 by an effective thermal barrier 66 accommodated within the well space 38 in encircling relation to the inner control stem 52 between the space 48 and the flow control assembly 20. Broadly, the thermal barrier 66 can be thermal insulating means suitable for mounting in the housing 36 in encircling relation to the inner stem 52 and being capable of effectively inhibiting the outward transmission of heat by conduction or convection. Functionally, a properly encased vacuum would be suitable for this purpose.

Preferably, the thermal barrier 66 is formed by an inert thermal insulating material, also denoted by the number 66, placed in the well space 38 in encircling relation to the inner control stem 52. The insulating material should not be vulnerable to attack by the fluid in the valve. One thermal insulating material inherently well suited for this purpose is ceramic wool.

In the preferred construction illustrated, the thermal insulating material 66 is retained in place by means including inner and outer journal discs 68, 70 which journal the inner and outer ends of the inner control stem 52 aganist radial displacement.

As shown, the inner journal disc 68 is fitted into the inner end of the well space 38 to rest against an annular support ledge 72 on the housing 36 and to closely encircle and radially journal the inner end if the inner control stem 52, the journal disc 68 being centrally apertured for this puropse.

A spacer sleeve 74 extends axially between the inner and outer journal discs 68, 70, as shown, in encircling relation to the inner control stem 52. The outer journal disc 70 closely encircles and radially journals the outer end of the inner control stem 52 in abutting relation to the outer end of the spacer sleeve 74 and fits closely within the encircling housing 36. The previously mentioned thrust washer or abutment 64 is spaced somewhat from the outer journal disc 70 to allow inward working movement of the washer 64.

The ceramic wool insulating material 66 is tightly packed into the well space 38 intervening radially between the housing 36 and spacer sleeve 74 and extending axially between the two journal discs 68, 70, the thermal insulating material thus filling virtually all of the well space 38 around the axially movable and rotatable inner control stem 52. An annular basket disc 76 of stainless steel wire mesh is preferably placed on the inner journal disc 68 to extend at its inner and outer peripheries outwardly along the spacer sleeve 74 and housing 36, respectively, to restrain the escape of fibers of the ceramic wool insulating material 66 around the inner journal disc 68 into the high temperature zone of the chamber 14 which contains the flow control assembly 20.

The fluid controlled by the valve fills all internal cavity space within the valve including the chamber space 48 intervening between the outer journal disc 70 and the bonnet 40 which contains the dynamic valve tightening spring 50. However, because of the close relationship of the inner and outer journal discs 68, 70 to both the inner control stem 52 and the encircling housing 36, the fluid accommodated within the valve outwardly of the inner journal disc 68 becomes quite stagnant and, as a practical matter, is substantially immovable with the consequence that no significant amount of heat is transferred by fluid convection to the internal space 48 adjacent the bonnet 40 from the chamber space 14 adjacent the flow control ball 22. In addition, the thermal insulating material 66 provides an effective barrier to the convection and conduction of heat between the chamber space 14 adjacent the ball 22, which is quite hot when the valve is in operation, and the internal space 48 adjacent the bonnet 40.

At the same time, the fluid in the space 48 adjacent the bonnet 40 is continuously cooled by the conduction of heat through the bonnet 40 to the external environment from the fluid in the space 48 in contact with the inner face of the bonnet.

As a consequence of the barriers imposed to the conduction of heat from the zone of the chamber 14 adjacent the ball 22 to the outer space 48 adjacent the bonnet 40 in conjunction with the continuous removal of heat from fluid in the space 48 through heat conduction through the bonnet 40, the fluid present in the space 48 adjacent the bonnet 40 and acommodating the spring 50 remains at a temperature much lower than the fluid temperature prevailing in the high temperature zone of the chamber 14 adjacent the ball 22, the space 48 thus constituting, in effect, a low temperature zone of the internal valve space.

By way of illustration, it has been found that when a valve of the character described is used to control fluid at temperatures of the order of 1200° to 1300° F., the temperature of fluid in the low temperature zone or space 48 can be of the order of 300° F. The temperature differential that can be created between the low temperature zone or space 48 and the high temperature zone of the chamber space adjacent the ball 22 can be controlled in the designing of specific valves by varying the axial length of the well space 38 occupied by the thermal insulation 66. The well space 38 is sufficiently large in transverse section in the valve illustrated to permit assembling and disassembling movement of the control assembly 20 into and out of its normal position in the chamber 14 when the structural parts normally accommodated within the housing 36 are removed from the valve.

By virtue of the lower relative temperatures prevailing in the low temperature zone or space 48 within the valve, despite the much higher temperatures existing around the ball 22, the dynamic spring 50 retains its capacity to maintain optimum dynamic tightening of the valve. At the same time, the relatively lower temperature maintained in the lower temperature zone or space 48 adjacent the bonnet 40 preserves from damage the essential seal or gasket 80 used to form a seal between the high pressure housing 36 and the removable bonnet 40 as illustrated in FIG. 2.

Also, by virtue of the lower relative temperature maintained within the thermally insulated space 48, the inner and outer seals 82, 84, employed to provide an effective rotary seal between the outer control stem 44 and the bonnet 40, are protected from overheating with the consequence that these seals can be formed to advantage either wholly or in part of sealing materials such, for example, as graphitized asbestos that can be reinforced to advantage by a wire mesh of a metal having good physical strength at high working temperatures. As shown, the inner portion of the outer seal 84 is seated against a thin lamina or washer 86 of metal that continuously grounds the control stem 44 electrically to the bonnet 40.

It is also noteworthy that the outer control stem 44 and connected operating handle 46 are effectively maintained at a temperature much lower than that of the fluid supplied to the valve even though these parts are made of metal. Here, it will be observed that the inner end of the outer control stem 44 is immersed in the relatively cool fluid in the low temperature zone or space 48. Moreover, the inner end of the outer control stem 44 is connected to the inner control stem 52, which extends into the zone of highest temperature within the valve, by only a slidable engagement of the tang 60 with the sidewalls of the slot 58 in the inner control stem.

The transfer of heat through the slidable coupling thus formed between the inner and outer control stems 52, 44 is much less than would occur if the two control stems were all one piece. As a consequence of the physical separateness of the outer control stem 44 from the inner control stem 52 and the low temperature of the fluid surrounding the inner end of the outer control stem, the transfer of heat to the operating handle 46 is limited with the result that its temperature does not reach levels at which use of the handle for its intended purpose would be unduly hazardous.

In the interest of minimizing cooling of the high temperature fluid normally conducted through the valve, the connecting conduits (not shown) are usually covered heavily with thermal insulating material (not shown) which is also applied in covering relation to the valve body 12. Such insulating material may also cover the exterior surface of the high pressure housing 36 with the consequence that the heat loss from the valve is minimized and the fluid is not significantly cooled by the valve, the bonnet 40 being at a temperature much lower than that of the fluid supplied, for the reasons described, and hence dissipating heat at a rate which does not seriously cool the fluid flowing through the valve while serving the described function of maintaining a relatively lower temperature in the thermally insulated zone or space 48 within the valve which is thermally insulated from the high temperature fluid in the valve.

It will be appreciated that the invention is not necessarily limited to the particular construction illustrated, but includes the use of variants within the spirit and scope of the invention as defined by the claims which follow.

I claim:

1. A ball valve comprising, in combination, a body defining an internal valve chamber and two flow passages opening into said chamber, said body defining two valve seat support surfaces encircling the inner ends of said respective passages and converging toward each other in one direction transverse to said passages, a movable flow control assembly comprising a ball rotatable about an axis parallel to said direction of convergence of said seat support surfaces and comprising two valve seats engaging the ball and being slidably supported on said respective seat support surfaces, said body having thereon a high pressure housing defining a well space opening inwardly into said chamber and extending outwardly therefrom in generally coaxial relation to said axis of ball rotation and in a direction that is the reverse of said direction of convergence, said well space having in transverse section a size that is at least equal to the corresponding size of said assembly to permit assembling and disassembling movement of said assembly through said well space into and out of said chamber, an axially movable and rotatable inner control stem having a rotary driving connection with said ball and extending outwardly within said well space in coaxial relation to said axis of ball rotation, a first journal disc fitted into said housing at the inner end of said well space and closely encircling said inner control stem to guide rotation of the latter, a spacer sleeve extending outwardly from said first journal disc within said well space in closely encircling relation to said inner control stem, a second journal disc fitted into said housing at the outer end of said well space and closely encircling said inner stem to guide rotation of the latter, thermal insulating material encircling said spacer sleeve within said housing between said first and second journal discs to inhibit the transmission of heat axially within said well space, a first thrust abutment carried by the outer end of said inner stem outwardly of said second journal disc, a bonnet removably secured to said housing in covering relation to said well space, a rotatable outer control stem journalled in said bonnet in coaxial relation to said inner stem and having an axially slidable driving connection with the outer end of said inner stem, temperature sensitive sealing means forming a rotary seal between said outer stem and said bonnet and being subject to damage by high temperatures, a second thrust abutment carried by the inner end of said second stem, a helical compression spring encircling said second stem between said bonnet and said second journal disc and engaging said first and second abutments to continuously transmit through said first abutment and said first stem an axial force to said ball to continuously urge said ball and said seats in said direction of seat convergence to effect optimum tightening of the valve, and operating handle means connected to the outer end of said second stem.

2. A ball valve comprising, in combination, a body defining an internal valve chamber and two flow passages opening into said chamber, said body defining two valve seat support surfaces encircling the inner ends of said respective passages and converging toward each other in one direction transverse to said passages, a movable flow control assembly comprising a ball rotatable about an axis parallel to said direction of convergence of said seat support surfaces and comprising two valve seats engaging the ball and being slidably supported on said respective seat support surfaces, said body having thereon a housing defining a well space opening inwardly into said chamber and extending outwardly therefrom in generally coaxial relation to said axis of ball rotation and in a direction that is the reverse of said direction of convergence, said well space having in transverse section a size that is at least equal to the corresponding size of said assembly to permit assembling and disassembling movement of said assembly through said well space into and out of said chamber, an axially movable and rotatable inner control stem having a rotary driving connection with said ball and extending outwardly within said well space in coaxial relation to said axis of ball rotation, a first thrust abutment carried by the outer end of said inner stem, a bonnet removably secured to said housing in covering relation to said well space, a rotatable outer control stem journalled in said bonnet in coaxial relation to said inner stem and having an axially slidable driving connection with the outer end of said inner stem, sealing means forming a rotary seal between said outer stem and said bonnet, a second thrust abutment carried by the inner end of said second stem, a spring located near said bonnet and engaging said first and second abutments to continuously transmit through said first abutment and said first stem an axial force to said ball to continuously urge said ball and said seats in said direction of seat convergence to effect optimum tightening of the valve, thermal insulating means disposed within said well space in encircling relation to said inner stem between said flow control assembly and said spring to form an effective thermal barrier to the transmission of heat outwardly through said well space, and operating handle means connected to the outer end of said second stem.

3. A ball valve comprising, in combination, a body defining an internal valve chamber and two flow passages opening into said chamber, said body defining two valve seat support surfaces encircling the inner ends of said respective passages and converging toward each other in one direction transverse to said passages, a movable flow control assembly comprising a ball rotatable about an axis parallel to said direction of convergence of said seat support surfaces and comprising two valve seats engaging the ball and being slidably supported on said respective seat support surfaces, said body having thereon a high pressure housing defining a well space opening inwardly into said chamber and extending outwardly therefrom in generally coaxial relation to said axis of ball rotation and in a direction that is the reverse of said direction of convergence, said well space having in transverse section a size that is at least equal to the corresponding size of said assembly to permit assembling and disassembling movement of said assembly through said well space into and out of said chamber, an axially movable and rotatable inner control stem having a rotary driving connection with said ball and extending outwardly within said well space in coaxial relation to said axis of ball rotation, a first journal disc fitted into said housing at the inner end of said well space and closely encircling said inner control stem to guide rotation of the latter, a second journal disc fitted into said housing at the outer end of said well space and closely encircling said inner stem to guide rotation of the latter, thermal insulating material substantially filling said well space axially between said first and second journal discs and radially between said housing and said inner control stem to inhibit the transmission of heat axially within said well space, a first thrust abutment carried by the outer end of said inner stem outwardly of said second journal disc, a bonnet removably secured to said housing in covering relation to said well space, a rotatable outer control stem journalled in said bonnet in coaxial relation to said inner stem and having an axially slidable driving connection with the outer end of said inner stem, heat sensitive sealing means forming a rotary seal between said outer stem and said bonnet, a second thrust abutment facing inwardly adjacent said bonnet, and a spring engaging said first and second abutments to continuously transmit through said first abutment and said inner stem a force to said ball to continuously urge said ball and said seats in said direction of seat convergence to effect optimum tightening of the valve.

4. A ball valve comprising; a body defining an internal valve chamber and two flow passages opening into said chamber, said body defining two valve seat support surfaces encircling the inner ends of said respective passages and converging toward each other in one direction transverse to said passages; a movable flow control assembly comprising a rotatable flow control ball and two valve seats engaging the ball and being slidably supported on said respective seat support surfaces; said body having thereon a high pressure housing defining a well space opening inwardly into said chamber and extending outwardly therefrom in generally parallel relation to said direction of convergence of said seat support surfaces; a bonnet removably secured to said housing in covering relation to said well space; rotatable control stem means including at least a first stem element journalled in said well space, and means connected to said stem for effecting rotation thereof, said stem element being interconnected in rotary driving relation to said ball and movable axially in said well space into abutting engagement with said ball; thermal insulating means disposed within said well space in encircling relation to said stem element and between said flow control assembly and said bonnet, in spaced relation to said bonnet, thereby to form an effective thermal barrier to the transmission of heat outwardly through said well space, and spring means housed within the valve adjacent said bonnet and outwardly of said thermal insulating means thereby to insulate said spring from the transmission of heat thereto wherein the operating characteristics of said spring are preserved, said spring being operably interconnected with said stem element continuously to urge said element into abutting engagement with said ball and thereby forcing the fluid control assembly in said direction of convergence of said seat support surfaces to effect optimum tightening of the valve.

5. A ball valve as defined in claim 4, wherein said stem element includes a first thrust abutment carried by the outer end thereof outwardly of said thermal insulating means, and said stem means further include a second stem element journalled to said bonnet in coaxial relation to said first stem element and having an axially slidable driving connection with the outer end of said first stem element, a second thrust abutment carried by the inner end of said second stem element, said spring means being disposed in encircling relation to said inner end of the second stem element and in engagement with said first and second abutments to transmit through said first abutment and said first stem element the axial force required continuously to force said fluid control assembly in the direction of convergence of said seat support surfaces.

References Cited

UNITED STATES PATENTS

| | | | |
|---|---|---|---|
| 2,524,009 | 9/1950 | Dopp et al. | 137—375 |
| 3,151,837 | 10/1964 | Leek | 251—214 |
| 3,208,470 | 9/1965 | Lidgard | 137—375 |
| 3,231,235 | 1/1966 | Anderson et al. | 251—214 |

WILLIAM F. O'DEA, Primary Examiner

D. R. MATTHEWS, Assistant Examiner

U.S. Cl. X.R.

137—375